May 29, 1934.   T. H. KRUEGER   1,960,945
TAPE SERVING MACHINE
Filed July 2, 1930   6 Sheets-Sheet 1

INVENTOR
THEODORE H. KRUEGER
BY
ATTORNEY

May 29, 1934.  T. H. KRUEGER  1,960,945
TAPE SERVING MACHINE
Filed July 2, 1930  6 Sheets-Sheet 2
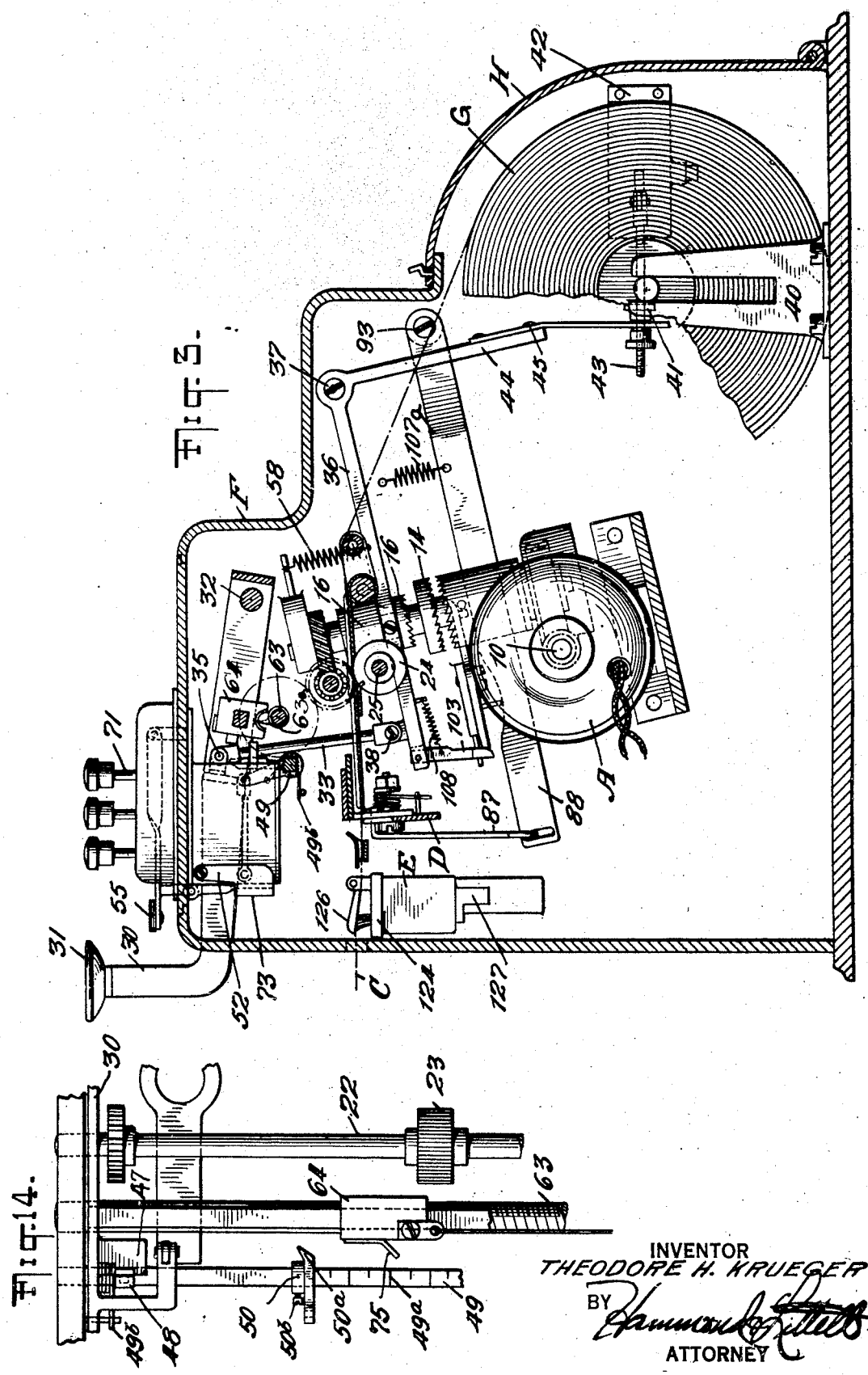
INVENTOR
THEODORE H. KRUEGER
BY
ATTORNEY May 29, 1934.  T. H. KRUEGER  1,960,945
TAPE SERVING MACHINE
Filed July 2, 1930  6 Sheets-Sheet 3
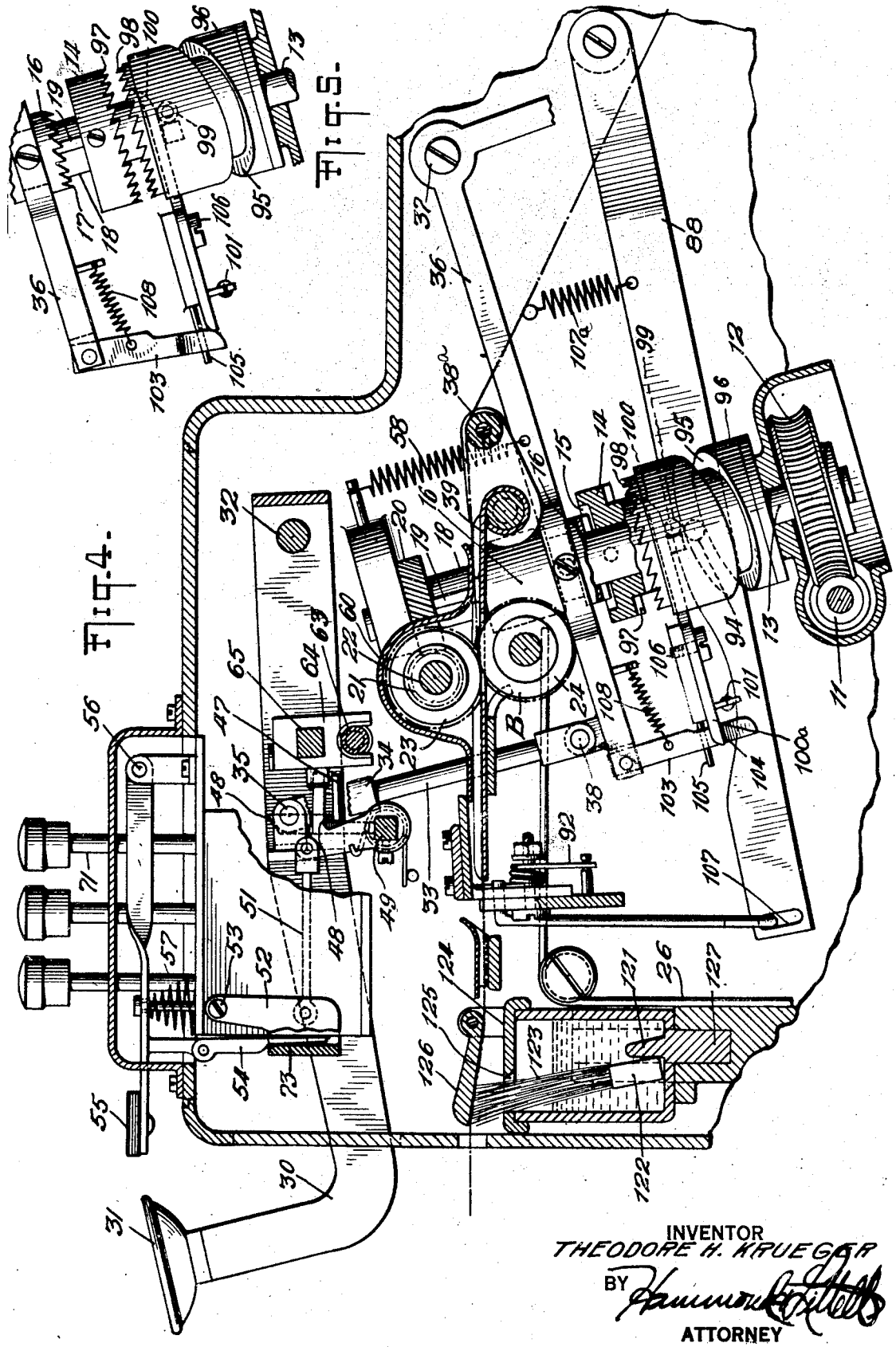
INVENTOR
THEODORE H. KRUEGER
BY
ATTORNEY

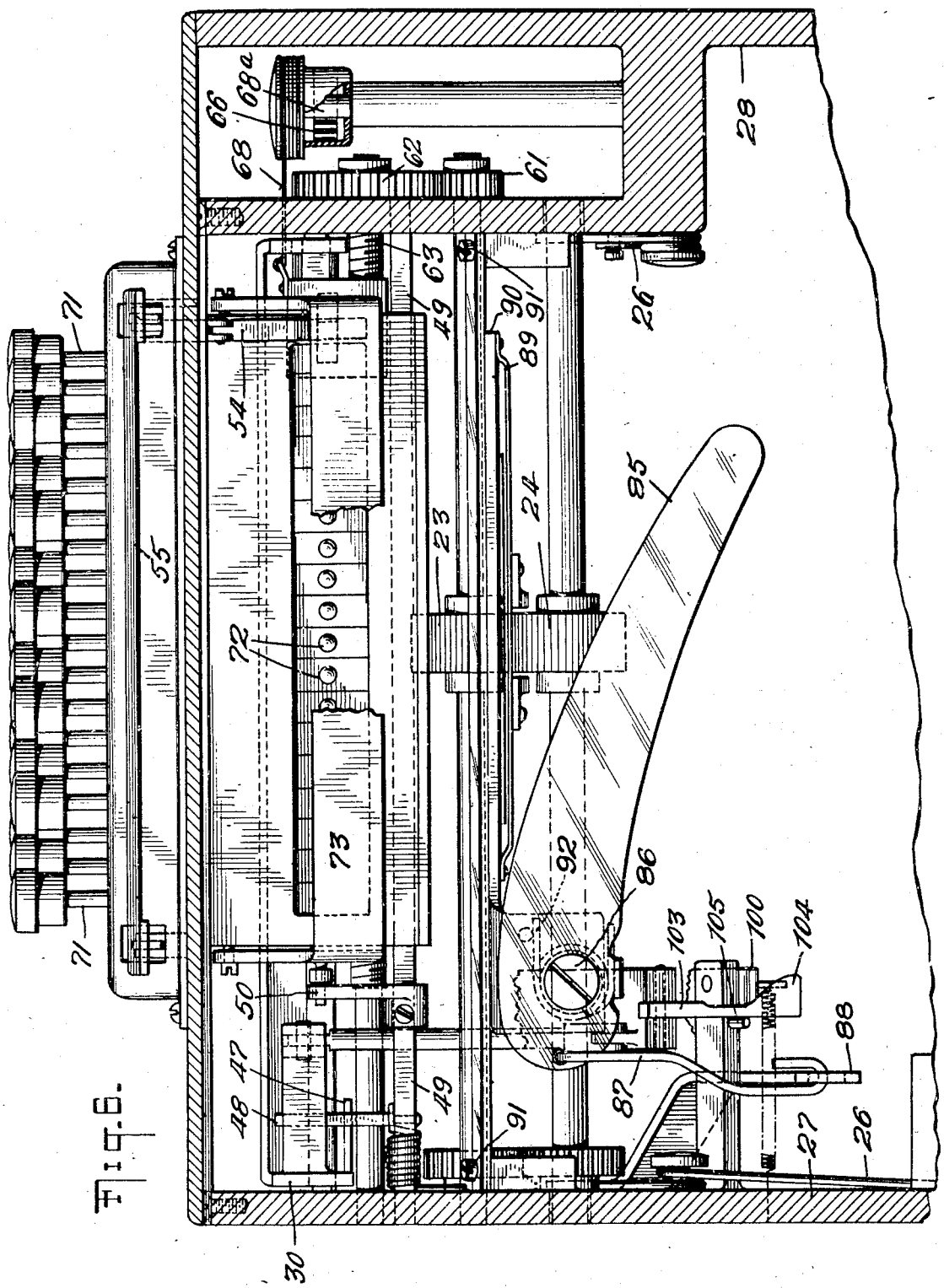

May 29, 1934.  T. H. KRUEGER  1,960,945
TAPE SERVING MACHINE
Filed July 2, 1930  6 Sheets-Sheet 5
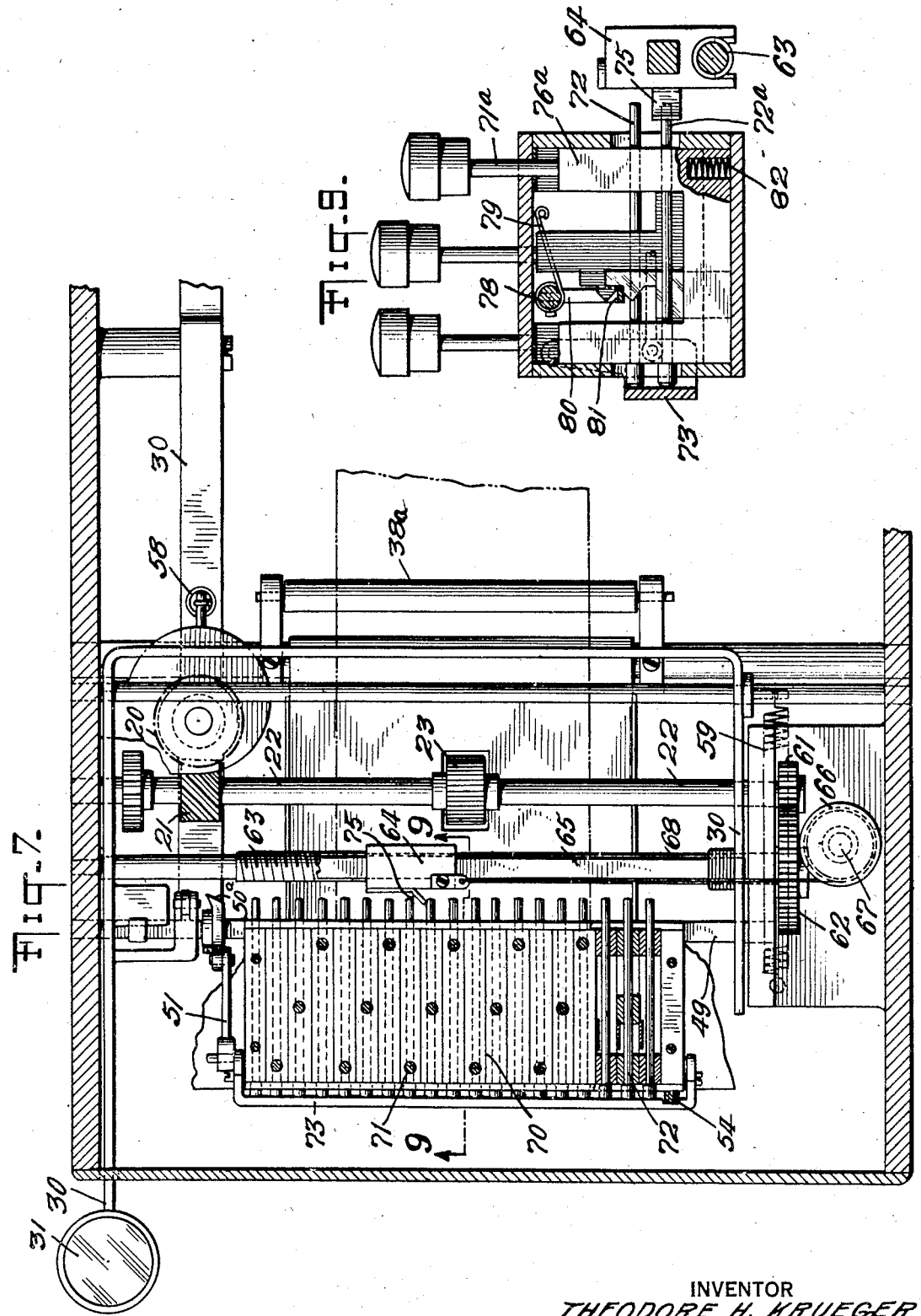
INVENTOR
THEODORE H. KRUEGER
BY
ATTORNEY May 29, 1934.  T. H. KRUEGER  1,960,945
TAPE SERVING MACHINE
Filed July 2, 1930   6 Sheets-Sheet 6
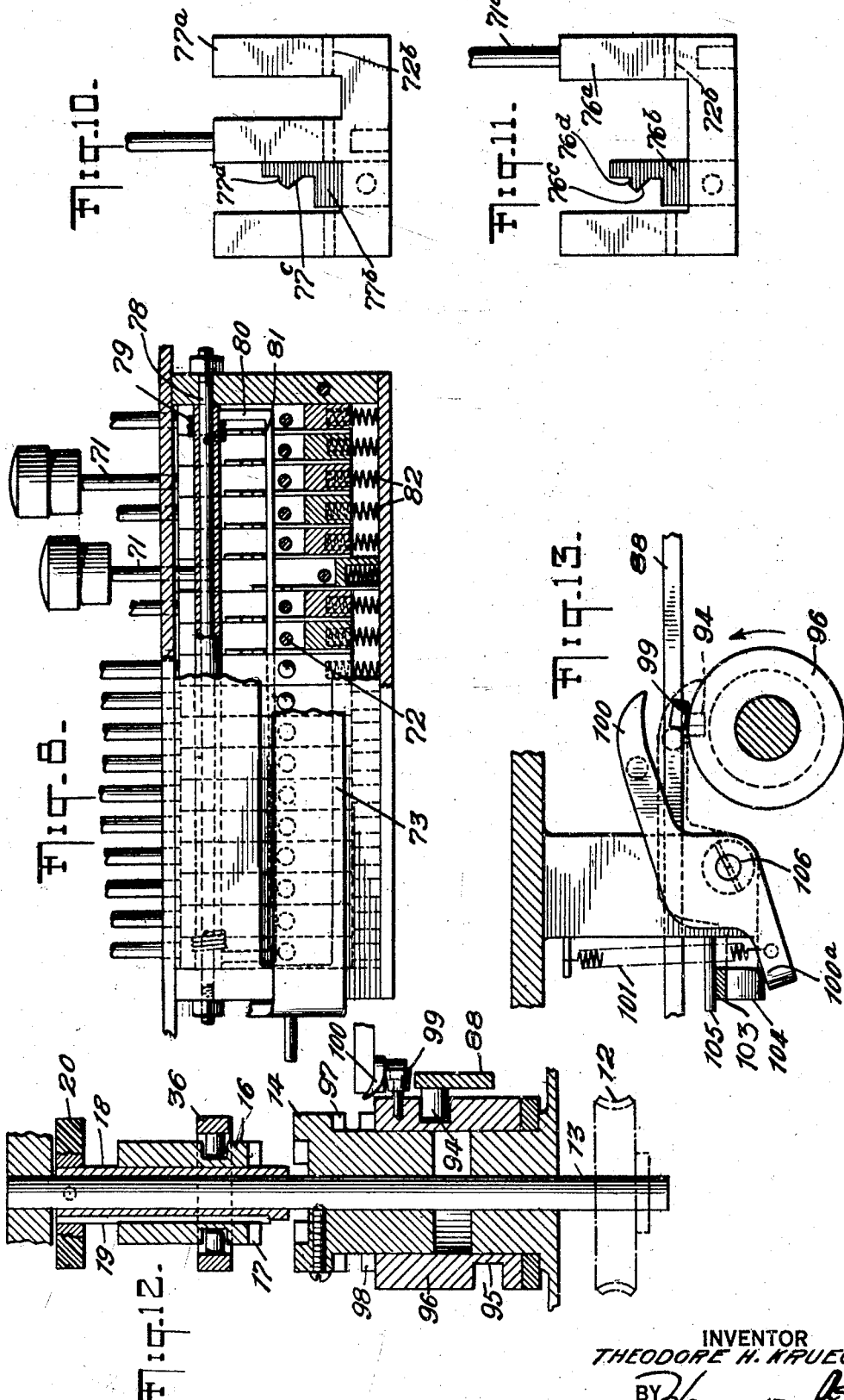
INVENTOR
THEODORE H. KRUEGER
BY Hammond & Littell
ATTORNEY Patented May 29, 1934

1,960,945

UNITED STATES PATENT OFFICE 1,960,945

TAPE SERVING MACHINE

Theodore H. Krueger, Derby, Conn.

Application July 2, 1930, Serial No. 465,331

3 Claims. (Cl. 164—42)

The present invention relates to motor driven tape moistening and dispensing machines and particularly relates to improved means for feeding measured lengths of the gummed tape.

Motor driven tape serving machines have been used in certain types of work which required accuracy and rapidity of operation inasmuch as the ordinary hand operated machine cannot be operated with sufficient speed when accurate lengths are needed. Clutches have also been used to prevent the residual motion of the motor from overrunning the tape. These prior machines have been difficult to regulate however and to change the tape adjustment was usually slow and difficult.

It is the principal object of the present invention to provide an improved measuring device which will accurately measure the tape dispensed and actuate the shearing and other mechanism to limit the dispensed tape to the correct amount measured and which may be readjusted with great rapidity.

A further object of the invention is to provide a reciprocating shuttle member, which travels in proportion to the movement of the tape from the machine and which will stop the machine after a predetermined movement.

A still further object of the invention is to provide a screw driven reciprocating shuttle positively driven from the feed roll mechanism, which when contacting with a predetermined measuring stop, will trip the feed roll mechanism and bring about the operating of the shearing device.

A still further object of the invention is to provide an operating key or lever which, when depressed, will start an electric motor, engage the feed clutch, and set the automatic measuring mechanism and when the automatic measuring mechanism reaches a predetermined point, the key will be released to disengage the feed clutch, shut off the electric motor and bring the shearing mechanism into operation and permit the return of the measuring mechanism to its original position.

A further object of the invention is to provide a keyboard having a plurality of keys corresponding to definite tape lengths for instantaneous changing of the measuring amount to any other desired amount.

A still further object of the invention is to provide a multiple row, self-correcting keyboard for selection of different lengths of tape.

A still further object of the invention is to provide an automatic motor driven tape serving device which may be adapted to measure and dispense definite lengths of tape and which may be provided with a universal adjustment of tape length if strips of any desired length, not within the range of the definite lengths of the first adjustment are desired.

Further objects and advantages of this invention will appear from the following description thereof, taken in conjunction with the attached drawings which are illustrative of two preferred forms of embodiment thereof and in which:

Fig. 3 is a vertical section through the machine with certain parts broken away to show the internal construction.

Fig. 4 is an enlarged vertical section showing the details of the feed roll drive.

Fig. 5 is a side elevation of a portion of the driving clutch.

Fig. 6 is a vertical section at right angles to Fig. 4, and showing the front end construction.

Fig. 7 is a horizontal section taken substantially below the top plate of the frame.

Fig. 8 is a vertical section through the feed control with parts broken away to show the internal construction.

Fig. 9 is a vertical section at right angles to Fig. 8 showing other details of construction.

Figs. 10 and 11 are detailed views of the keys.

Fig. 12 is a substantially central vertical section through the clutch.

Fig. 13 is a horizontal section through the knife control release.

Fig. 14 is a partial plan view of a modified form of feed control.

Figure 2:
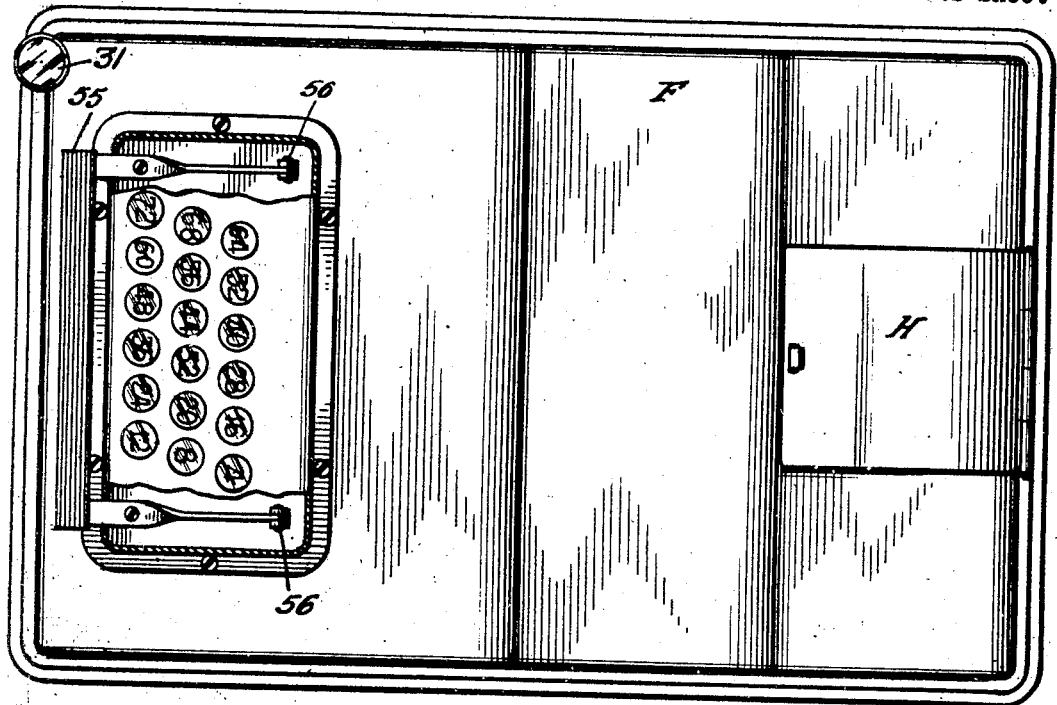
Fig 2 is a top plan view of the machine shown in Fig. 1.
Figure 1:
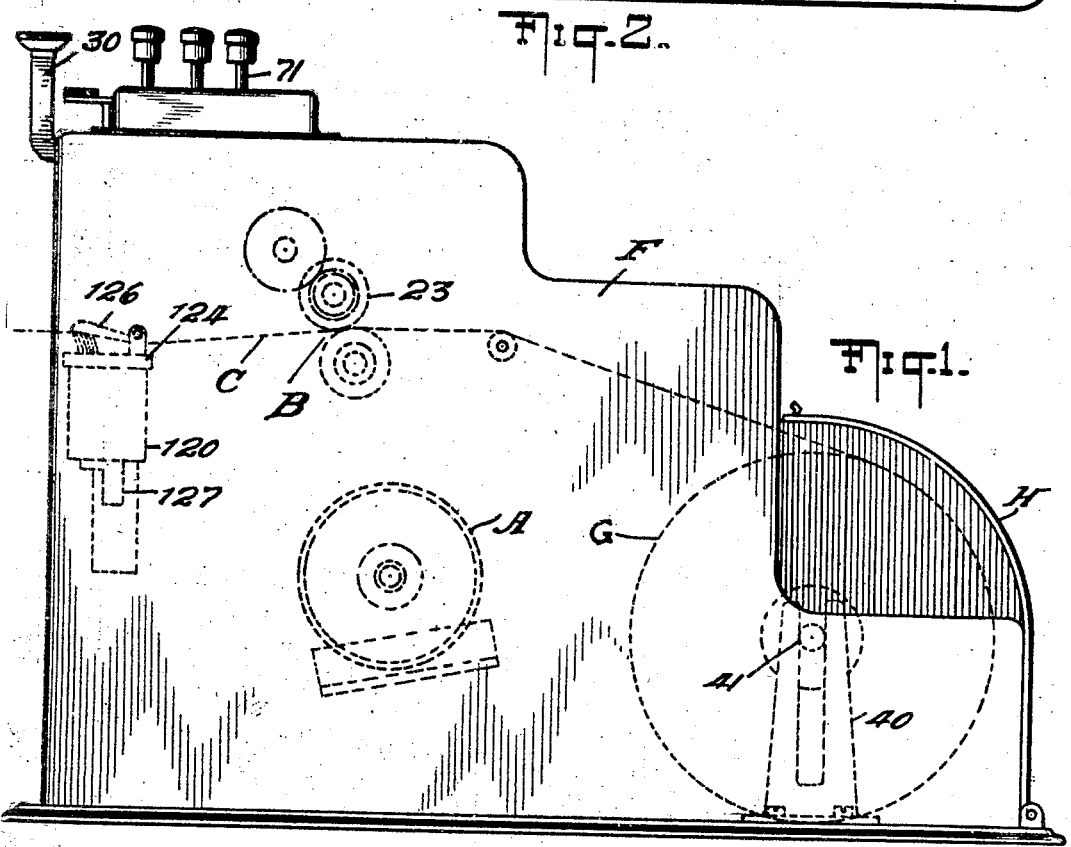
Fig. 1 is a side elevation of the tape serving machine.

The electrically operated tape serving device illustrated comprises four particular elements, namely, the tape feed mechanism, the automatic feed control, the knife operating mechanism and the moistener.

*Tape feed mechanism*

The motor A shown in Fig. 3 operates the feed rolls B to force the tape C past the shear D and the moistener E. These parts are mounted in the casing F and are essential in the particular machine to serve moistened gum tape. In the present invention, the manner by which the five elements are made operative as well as the provision of a device to accurately measure the amount of tape desired, is the particular subject matter to be disclosed.

The motor A is provided with a spindle shaft 10, having a worm 11 which drives the worm wheel 12, secured on the shaft 13 shown in Fig. 4 and this latter shaft is provided with a fixed collar 14 having dog teeth 15. A clutch element 16 is provided with cooperating teeth 17 (see Fig. 5) and is splined on the shaft 18 having the spline 19. A mitre gear 20 is made secure to the shaft 18 and drives the mitre gear 21 operatively secured to the driving spindle 22 (see Fig. 7). A knurled friction roller 23 is mounted on the spindle 22 midway of the ends and cooperates with a similar knurled friction roller 24 mounted on a free spindle 25 which is resiliently pressed against the driving roller 23 by the tensile springs 26 mounted on the side plates 27 and 28 of the machine.

A control lever 30 is provided with a finger key 31 adapted for downward movement and as particularly shown in Fig. 4 the lever 30 is pivoted at 32 and intermediate its ends a clutch engaged link 33 is secured by means of a clevis 34 pivoted to the lever at the point 35. In Fig. 3, lever 30 is shown in the upward or inoperative position and the clutch fork 36 pivoted at the point 37 and to which the link 33 is pivoted at the point 38 is also in the upward or inoperative position and the driven teeth 17 on the driven clutch member 16 are separated from the driving teeth in the clutch driving collar 14. In such a position the motor A would thus be free to rotate without causing actuation of the tape feed spindle 22, although as will be noted hereinafter, the upward movement of the lever 30 stops the motor A.

If the lever 30 is depressed by applying the finger to the key 31 as shown in Fig. 4 the link 33 will cause a rotation of the clutch fork 36 about the fixed pivot 37, thereby causing an engagement between the driving member 14 and the driven member 16. If the motor A is then operated the worm 11 will rotate the worm wheel 12 driving the shaft 13, and through the clutch members 14 and 16 will rotate the spline shaft 18 and the mitre gear 20, which in turn drives the mitre gear 21, rotating the spindle 22 and causing rotation of the knurled feed rollers 23 and 24. The tape C which passes between the feed rollers 23 and 24 is thus drawn from the tape roll G over the antifriction roller 38a and is then dispensed from the machine past the moistener E, which operates in a manner as will be hereinafter discussed.

As shown in Fig. 3, a U-shaped standard 40 is mounted on the base of the machine and is adapted to receive the core 41 of the tape roll G. In the particular instance the tape roll itself frictionally engages the base of the machine to prevent undue overrunning of the roll, and as the standard is U shaped it will accommodate various sized rolls which will always frictionally engage the base of the machine. A door H is provided in the rear of the casing F which is adapted to permit insertion of replenishing rolls.

Motor control switch 42 of the toggle type is mounted on the side plate 27 of the casing F and is operated by means of an adjustable control arm 43 to which the bell crank arm 44 of the clutch control fork 36 is adjustably secured. A micrometer adjustment 45 may be provided by the connecting arm 43 and the bell crank lever arm 44 for more careful adjustment of the switch control.

The lever arm 30 has a projection 47 mounted intermediate its end and a latch member 48 is secured to a latch member release bar 49 and cooperates with the projection 47 when the lever 30 is in the lowermost position. A latch release member 50 is also mounted on the release lever bar 49 and the release member is connected by a link 51 with the lever 52 which is pivoted at 53 and is adapted to be operated by the wedge 54 secured to the stop bar 55. The stop bar 55 is pivoted at 56 and is held in the uppermost position by the coil spring 57.

Up to this point the machine is operated as follows:

The finger key 31 on the lever 30 depresses the clutch fork 36 to engage the motor driving clutch and the movement of 36 causes a rearward movement of the switch control arm 44 which makes the contact in the electric switch 42 and energizes the motor, in this operation the projection 47 is engaged by the notch in the latch member 48 to hold the clutch fork 36 in its depressed position with the motor and other parts operating until the clutch fork 36 is released. The clutch is already engaged and as the motor rotates it feeds the tape by the rotation of the friction feed rollers in contact therewith. The manual release is brought about by depressing the stop bar 55 which operates the wedge 54 and lever 52 causing a rotation of the latch release bar 49 releasing the latch 48 from the projection 47 and permitting the operating lever 30 to rise. A spring 58 and spring 59 cooperate to return the starting key 31 to its initial position and the upward movement of the lever 30 thus causes an instantaneous disengagement of the clutch to prevent any over-running of the tape due to the momentum of the motor A and the motor is simultaneously shut off by the movement of the motor switch control arm, but due to the residual energy in the motor shaft the motor will normally rotate a slight amount as the switch is moved to the off position. The tape feed, however, instantly ceases due to the disengagement of the clutch and friction on the feed rollers. A cover 60 is provided over the upper roller 23 to prevent balling up of the tape and to act as a guard.

*Automatic feed control*

Referring to Fig. 7 and Fig. 14, it will be noted that the spindle 22 is provided with a gear 61 in contact with a gear 62 connected to a screw shaft 63. The screw 63 extends substantially the full width of the machine and is adapted to move a shuttle 64 in a single direction across the face of the machine. The shuttle is mounted on a square frame 65, as shown in Fig. 4, which frame is also mounted on the lever 30 which, as seen in Fig. 7, is of U shape. The lower portion of the shuttle 64 has a cooperating screw 63a (see Fig. 3) and due to the positive rotation of the feed roller spindle 22, the screw 63 will be positively rotated causing a travel of the shuttle in a straight line across the machine. This travel is calibrated to the movement of the tape through the machine and the distance the shuttle moves from its initial position will be exactly proportional to the amount of tape dispensed by the feed rollers. A clock spring 66 mounted on a vertical shaft 67 is connected to the shuttle 64 by means of a cord or wire 68 so that upon release of the lever 30 to its upper position the shuttle 64 will become disengaged from the screw 63 and will be withdrawn to its initial position.

In the operation of the automatic feed control of Fig. 14, the latch release bar is provided with a calibrated scale 49a and the latch release member 50 adjustable along the length of the bar 49. The latch release member 50 is provided with a finger 50a which cooperates with a finger 75 on the shuttle 64 to cause a rocking of the bar 49 to release the latch 48. A screw adjustment 50b is provided in the latch release member 50 so that the member 50 may be moved to any position on the bar 49, and as the scale and the bar 49 are parallel to the screw 63 and to the rectilinear movement of the shuttle 64 and as the movement of the shuttle 63 is thus an exact indication of the amount of tape which will be dispensed from the machine the latch release bar may be set to operate to trip the feeding means at an exact point corresponding to the amount of tape fed from the machine. A spring 49b is coiled around the bar 49 and tends to hold the latch 48 in proper position to engage the depressed lever 30. It is also to be understood that as the latch release member 50 may be moved any amount along the bar 49, it is possible to get a universal adjustment and any desired length of tape up to the capacity of the machine can be accurately measured; and if the same length of tape is desired to be dispensed at repeated times, the adjustment may be left stationary, and by repeated depressions of the operating lever 30 the same amount of tape will be repeatedly dispensed.

*Self-correcting keyboard*

A slightly modified form of construction is shown in Fig. 7, which includes the use of a self-correcting keyboard 70 having a plurality of keys 71 is provided adjacent the screw 63, and co-operating with the keys 71 are a plurality of transverse pins 72. These pins extend and contact with the release bar control arm 73 on the lever 52. A movement of the pins 72 against the bar 73 will cause release of the starting lever 31 due to the actuation of the link 51 and the rotation of the latch release bar 49 heretofore described. The movement of the pins is brought about by the contact of the shuttle finger 75, mounted on the shuttle 64, and the movement of a pin 72 into position to become engaged by the contact finger 75.

The particular operation of the pin and shuttle is shown in Fig. 9 in which the pin 72 is shown in the usual non-operative position, but due to the depression of the key 71a the adjacent pin 72a is depressed into line with the shuttle finger 75 when the shuttle 64 is contacting with the screw 63. As the shuttle is moved by the screw 63, the finger 75 engages the pin 72a and causes an outward movement of the bar 73, which in turn retracts the link 51 and causes a release of the starting arm 30. Inasmuch as the movement of the shuttle is proportional to the movement of the tape from the machine it is thus possible to depress a certain key at a definite point along the face of the machine to cause the depression of a certain pin which will engage the shuttle as it reaches that point causing the shuttle to force the pin 72a, which is depressed, into contact with the bar 73 and stop the machine at any desired point. The keys being calibrated may therefore be arranged to permit dispensing of definite lengths of tape such as at four inch intervals, and it would only be necessary to depress the particular key corresponding to the exact length desired and after the starting lever was moved into position the tape would be fed from the machine and the shuttle would move across the screw until the pin depressed would be moved by contact with the shuttle finger and the starting lever would then be instantly released to disengage the clutch and thus instantly stop the feeding. If it is necessary to stop the machine before the particular amount of tape is dispensed the stop bar 55 may be depressed which would automatically stop the operation of the machine.

In order to provide a maximum number of variable strip lengths which the machine will dispense it is desirable to stagger the keys 71 and present them in one or more rows due to the limited width of the machine. In the present instance three rows are provided, with six keys in each row. It is therefore possible to serve eighteen different lengths and to vary the length at will by merely depressing the key bearing the right feed length number. With the present gearing of the screw, lengths of tape at four inch intervals can be dispensed between each key and all multiples of four inch lengths from four inches to six feet can therefore be dispensed. It is, of course, possible to change the gearing so that greater or shorter lengths and greater or shorter intervals could be dispensed from the machine as desired.

The keyboard is self-correcting and the depression of any key will cause the immediate release of any other key. This permits instantaneous actuation and change of length and prevents error in serving tape when a predetermined length is desired. This self-correcting feature is shown in Figs. 8, 9, 10, and 11 and it will be noted that three forms of keys corresponding to the three rows are provided. Key 76a in the first row is substantially U shaped and has a cam 76b having a lower angular cam face 76c and a sharp angular upper surface 76d. Center key 77a is E shaped and similarly has the cam 77b with the lower angular cam surfaces 77c, and the sharp angular upper cam surface 77d similar to the surfaces shown in connection with keys 76a. All keys are provided with apertures 72b to receive the pins 72. Extending across the keyboard 70 is a rotatable shaft 78 which is rotated in counter-clockwise direction by means of the spring 79 and extending from the shaft 78 is a latch 80 having a right angled projection 81. This projection 81 also extends the length of the keyboard and when a key is depressed the angular cam face 76c or 77c, or the equivalent face on the third key will cause a partial rotation of the shaft 78 in a clockwise direction as the bar 81 will contact with the cam surface 76d or 77d, or the equivalent square angled cam surface on the third row of keys. Such rotation will release any key which is thus being held down by contact of the bar 81 with the cam surface 76 or 77c or 77d and as the key which is being depressed will not only cause outward movement of the bar 81, but will permit the bar 81 to return after the cam has passed, the bar will then engage with the sharp angled projection 76d and hold the subsequently depressed key in the lowermost position. Suitable springs 82 will force the keys up when they have been released.

*Knife operating mechanism*

A knife 85 is pivoted at 86 on the frame, as will be seen in Fig. 6, and is adapted to be pulled into operating condition by a link 87 operated from the knife operating arm 88. The knife is positioned to the front of the machine and is placed on the opposite side of the feed rollers with respect to the tape roll G. The blade is adapted to be raised to pass the tape chute 89 formed by a guard adjacent the shear plate 90 which is mounted on the knife side of the rollers and secured to the frame by the bolts 91. As the tape passes the shear plate 90 it is confined within the guard plate or chute 89, and as the knife blade is pivoted into operative position, the dispensed tape will be severed from the main roll. The tensile spring 92 is suitably mounted on the pivot 86 and maintains the knife in the open position during normal operation of the machine.

The knife operating arm 88 is pivoted to the side frame 27 at the point 93, as will be seen in Fig. 3. Intermediate its ends it is provided with a projection 94 as particularly shown in Fig. 13, and this projection operates in a cam groove 95 in a rotatable collar 96, freely mounted on the fixed clutch member 14. As will be seen from Figs. 5 and 12, the clutch member 14 is provided with dog-teeth 97 which cooperate with corresponding teeth 98 on the collar 96. The free collar 96 is also provided with a projecting member 99 which cooperates with cam 100 and normally maintains the movable collar 96 out of contact with the teeth 97 of the driven clutch member. The normal position of the cam 100 is shown in full line in Fig. 12 and in dotted line in Fig. 13. The spring 101 holds the cam 100 in contact with the projecting member 99 to retain the movable collar 96 in its lowermost position and to prevent the knife from operating.

A knife release cam 103, as shown in Fig. 3, is secured on the extreme movable end of the clutch fork 36 and, as shown in Fig. 6, it is provided with an enlarged cam surface 104 at the free end thereof. One side of the knife release cam abuts a pin 105 and on the other end cooperates with the rear of the cam 100 as will be more clearly shown in Fig. 13. As the clutch fork is released to permit the clutch 16 to become disengaged the clutch fork arm 36 rises and causes the knife release cam 103 to rise with it, and as the enlarged portion of the cam 104 engages the rear 100a of the cam 100 it will cause a rotation of the cam 100 about a central pivot 106 against the tension of spring 101 and thus permit the projecting member 99 to rise with the free collar 96. As the collar 96 is thus free to move upward, inasmuch as the cam 100 has been displaced, the clutch teeth 97 and 98 engage to drive the free collar with the residual power of the motor. There is only residual power in the motor inasmuch as the upward movement of the clutch fork 36 has opened the switch circuit to shut off the motor. As the free member 96 rotates a single turn, the projecting member 99 again comes under the cam 100 which is automatically released as the cam face 104 passes over the surface 100a and the free collar 96 is then moved into the inoperative position causing the disengagement of the clutch teeth 97 and 98. Due to the positive drive of the free member 96 and due to the irregular path configuration of the cam surface 95, the cam follower 94 on the knife operating arm 88 will be forced downward in the first half of the revolution to force the knife blade up thus operating the knife a single time. The cam follower then rises and the knife blade drops to inoperative position. A single movement of the knife is sufficient to sever the paper, and as the cam 100 is placed in the path of the projecting member 99, the knife is operated through a complete movement but a single time by the residual momentum of the motor. A spring 107 draws the operating arm 88 upward and when the projecting member 99 is released, the free collar 96 is drawn upward to engage the teeth 97, and the spring 107a thus insures coaction between the clutch teeth 97 and 98. The knife release cam 103 is adapted to release the cam 100 but a single time on a complete movement of the operating arm 31, and due to the depression of the operating lever 30, the cam 103 will normally slide off the face against the tension of spring 108 of the cam 100 and will then be drawn into position so that when again raised, the cam will cause a release of the cam 100 and thus the release of the knife actuating mechanism. A slot 107 is provided in the end of the lever 88 to provide for free movement of the lever 88 and spring 108 is provided to hold the cam 103 into position as shown in Fig. 5.

It will thus be seen that the operation of the machine contemplates depressing the operating lever or key momentarily and the latch engages the lever and holds it in downward position. The depression of the lever turns on the switch so that the motor begins revolving and also causes the engagement of the clutch whereupon the motion of the motor is instantly transmitted to the feed rolls which being feeding tape toward the moistener. The rotation of the motor is also transmitted to the shuttle advancing screw which begins to revolve, and the shuttle which has been pressed into engagement with the revolving screw by the depression of the operating lever begins advancing the shuttle toward the measuring key. The movement of the shuttle is synchronized with the motion of the tape through the machine.

When the required amount of tape has been fed out the shuttle strikes the key in its path which corresponds with the predetermined amount of tape, causing the latch to release its hold on the operating lever. The operating lever spring instantly returns the operating lever to its original upward position, thereby disengaging the feed clutch which stops the further travel of the tape, disengages the shuttle from the screw allowing the shuttle spring to return the shuttle to its original position, shuts off the motor current and releases the knife actuating cam and engages the knife actuating arm with the clutch and the residual motion of the motor operates the knife to shear off the measured length of tape.

Since the whole series of operations is brought to a close by the shuttle striking a depressed key, and since the keys are mounted adjacent the travel of the shuttle it is evident that the length of the tape strip can be changed by depressing the desired key corresponding to the amount of tape desired. If a key is depressed so that the shuttle will trip it after a short shuttle travel, then a short piece of tape will be fed out and cut off similarly, different keys will measure different lengths of tape.

The depression of the measuring keys does not start the machine in operation, it merely takes the place of a readjustment of the position at which the latch will be engaged by the shuttle to stop the machine. When a key is depressed it will stay down indefinitely until another key is depressed, and it is therefore possible to dispense the same length of tape indefinite numbers of times by merely depressing the operating key. The operator must depress the main operating key each time he desires the motor started and the tape fed therefrom, and each time the operating lever is released the motor is shut off as well, although it does not instantly stop but causes a single actuation of the knife. The advantage of the keyboard is that it requires only an instant to change from any length to any other definite length, as it merely requires the depression of a single key. Each key calls for a definite length of tape, and no lengths but those called for by two adjacent keys can be accurately measured by the machine.

*Moistener*

The moistener E comprises the receptacle 120 adapted to hold a fluid such as water and the bottom of the receptacle is provided with a projection 121 which cooperates with the ferrule 122 of the brush 123. A removable cover 124 is mounted on the top of the receptacle and this cover has an opening 125 through which the brush 123 extends. A pivoted and weighted flap 126 is mounted on the cover 124 and extends over the opening 125 to engage the brush 123. The pivoted end of the flap 126 is spaced a slight distance above the cover 124 so that the tape will pass therethrough. The tape then passes between the flap and the brush and the slight tension insures a good contact between the moistened ends of the brush and the gummed surface of the tape and therefore provides a uniform moistening of the tape. Projecting legs 127 permit removable support of the receptacle 120 on the frame of the machine.

Although the showing of the screw and shuttle is parallel to the feed roll spindles and to the key-board, it is possible to construct the course of the shuttle so that it will rotate about a fixed center rather than travel in rectilinear direction. It would be necessary to construct the keyboard on a circular frame to cooperate with the shuttle movement under such conditions.

While I have shown preferred forms of embodiment of my device, I am aware that other modifications may be made thereto and I therefore desire a broad interpretation of my device within the scope and spirit of the disclosure thereof and of the claims appended hereinafter.

I claim:

1. In a tape serving machine having a tape supply and a tape severing device, and a driving motor, the combination of a feeding means and a control for said feeding means, said control including a shuttle moving in synchrony with the tape fed from the machine, a clutch mechanism, a visual length measuring key board, a plurality of keys in said key board cooperating with said shuttle to disengage said clutch to stop the tape feed when one of said keys is in operative position, a linkage between said clutch and said severing device operated by the residual motion of the driving motor to actuate said severing device, and means to place all other keys in inoperative position by the movement of any one key into operative position whereby the length of tape to be fed may be instantly varied.

2. In a tape serving machine having a tape supply, a tape severing means and mechanical means for feeding tape from said supply past said severing means and operating said severing means, the combination of a length control for said fed tape, said control including a shuttle movable in synchrony with the fed tape, a clutch for the mechanical means, a starting lever for engaging the clutch and starting the feed of tape and moving the shuttle into operative position, a release lever for releasing the starter lever and returning the shuttle to initial position, a length key board, a plurality of keys in said key board, each key corresponding to a fixed length of tape and determining the length of tape fed when in the operative position, the operative key actuating the release lever to stop the feed and actuate the severing device, and means to release any key from its operative position by the movement of any other key to the operative position.

3. In a variable length tape serving machine of the class described having a power supply for dispensing tape therefrom, a length control comprising a plurality of keys, each corresponding to a fixed length of tape when in an operative position, means to hold a single one of said keys in operative position to determine the fixed length of tape corresponding thereto and to stop the power supply, means carried by all of said keys to release any key in operative position when any other key is moved into the operative position, and means to sever the tape including a severing device, means to actuate the severing device on residual rotation of the power supply.

THEODORE H. KRUEGER.